July 30, 1957   J. H. FRIEDMAN   2,800,669
PIVOTALLY OPERATED CUTTERS IN A NAIL MAKING MACHINE
Filed Sept. 19, 1952   16 Sheets-Sheet 1
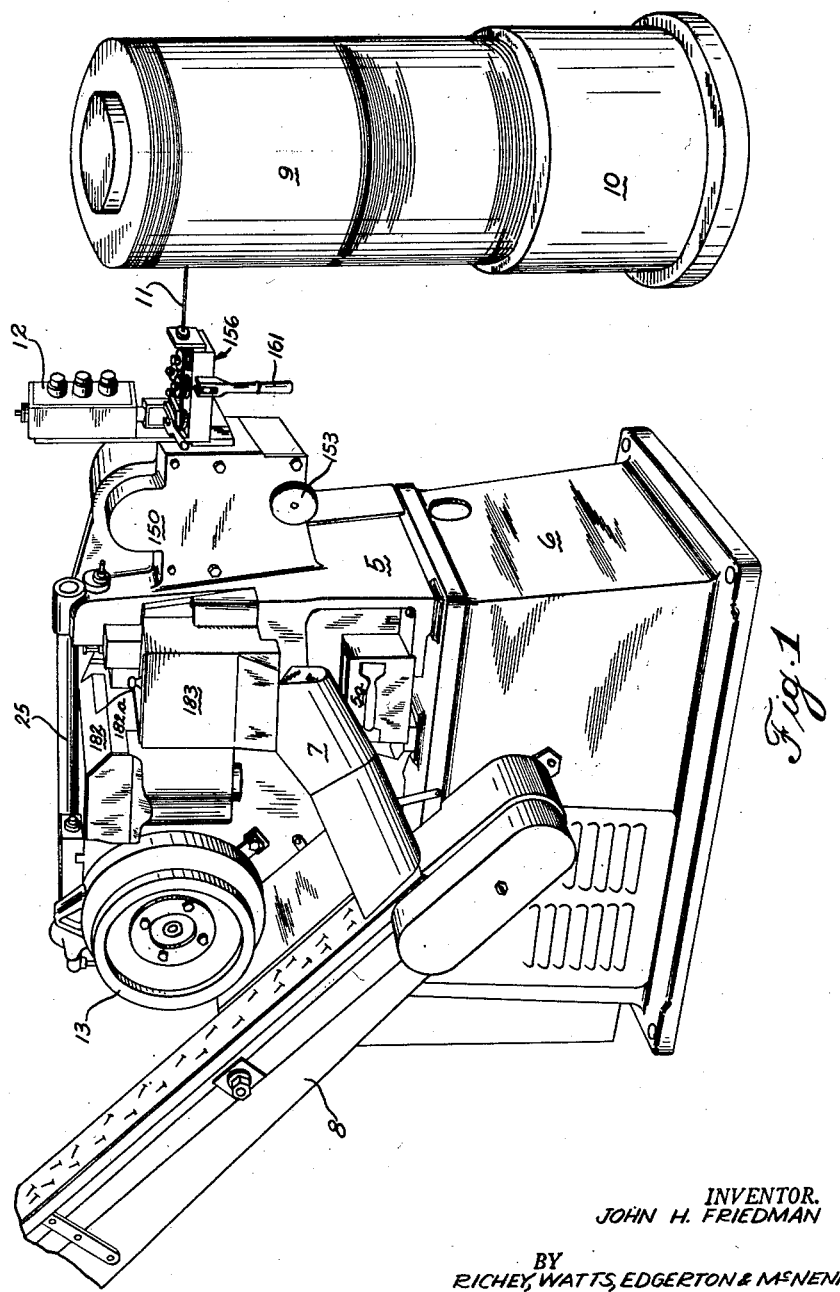
INVENTOR.
JOHN H. FRIEDMAN
BY
RICHEY, WATTS, EDGERTON & McNENNY
Donald W. Farrington
ATTORNEYS

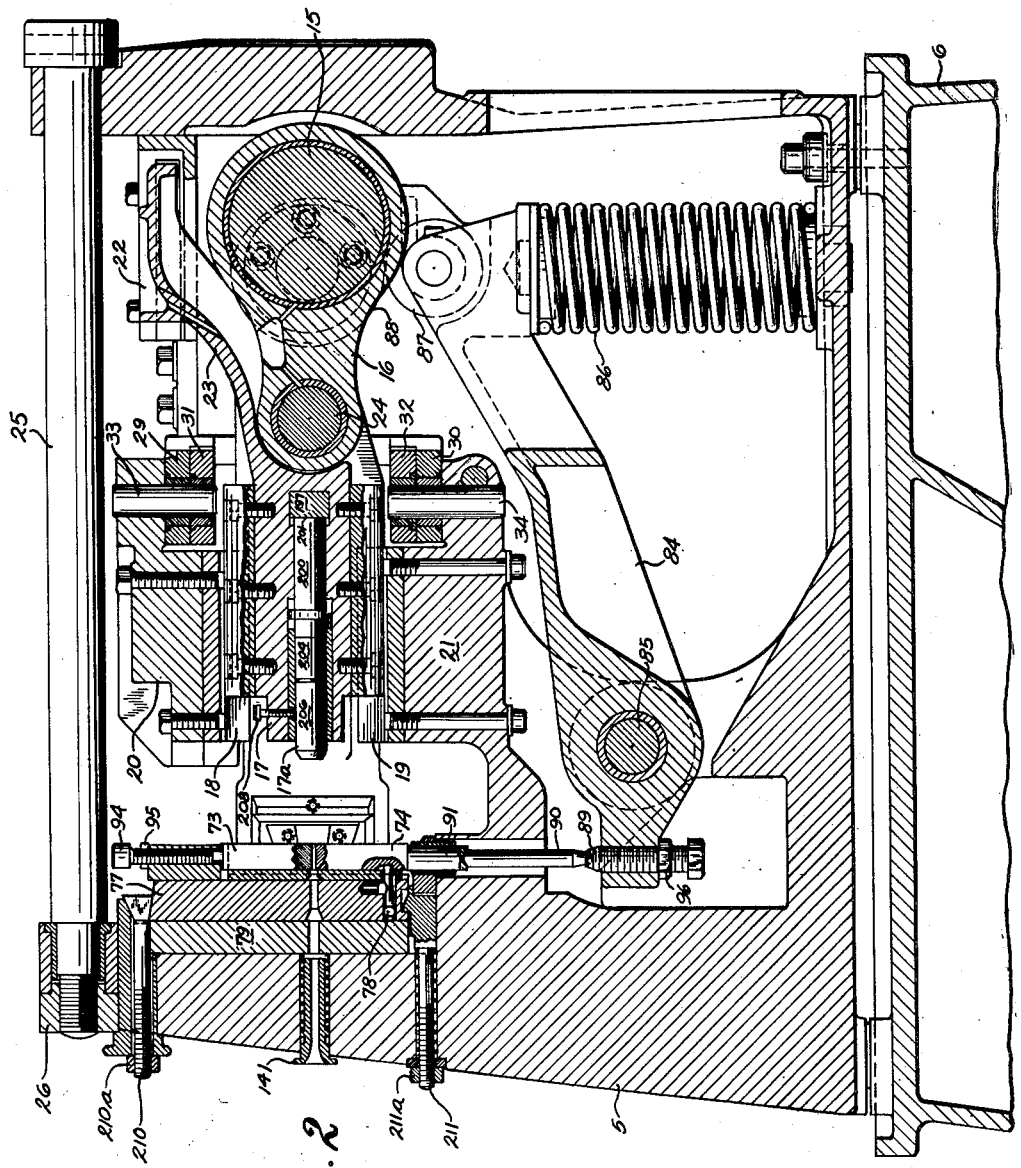

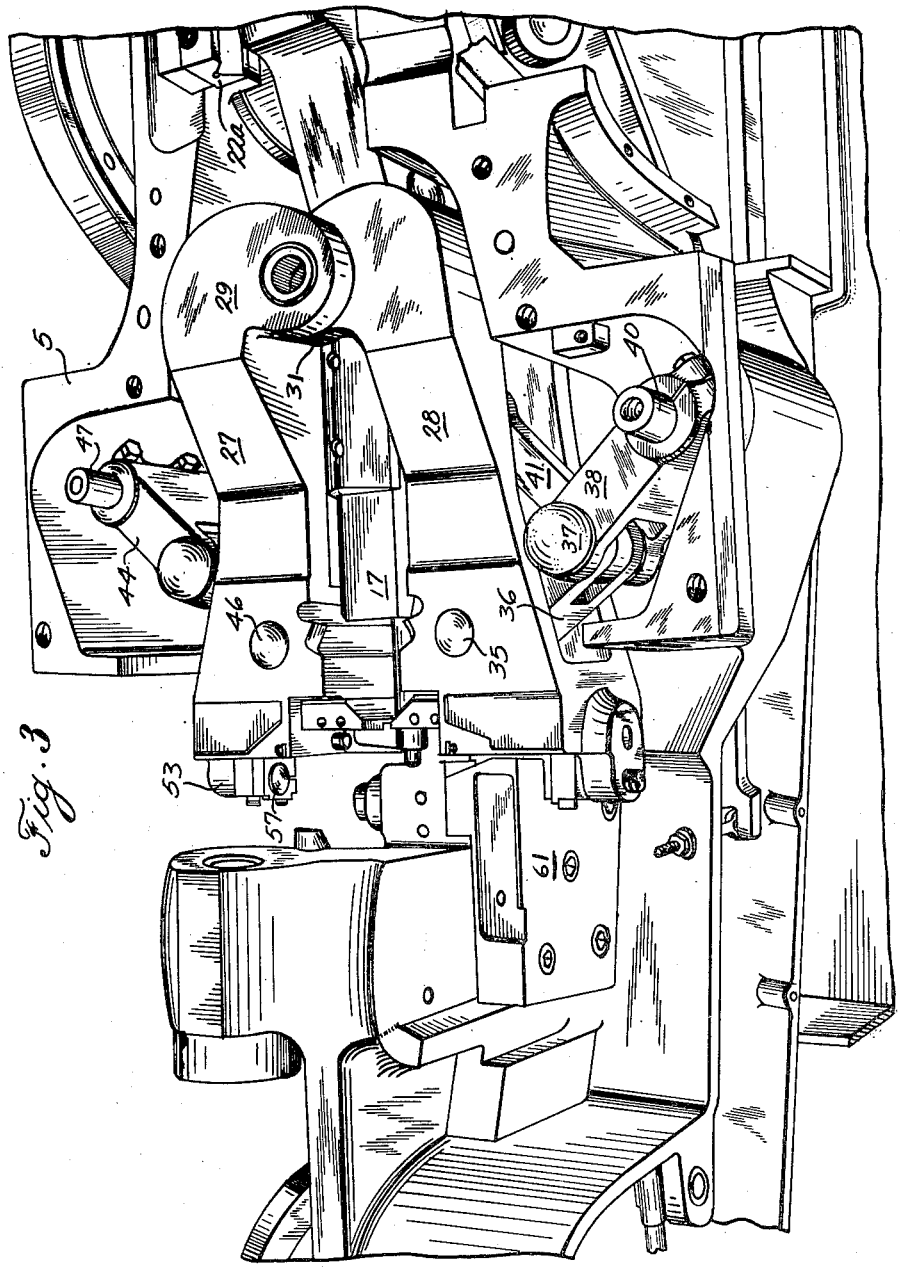

July 30, 1957 J. H. FRIEDMAN 2,800,669
PIVOTALLY OPERATED CUTTERS IN A NAIL MAKING MACHINE
Filed Sept. 19, 1952 16 Sheets-Sheet 4
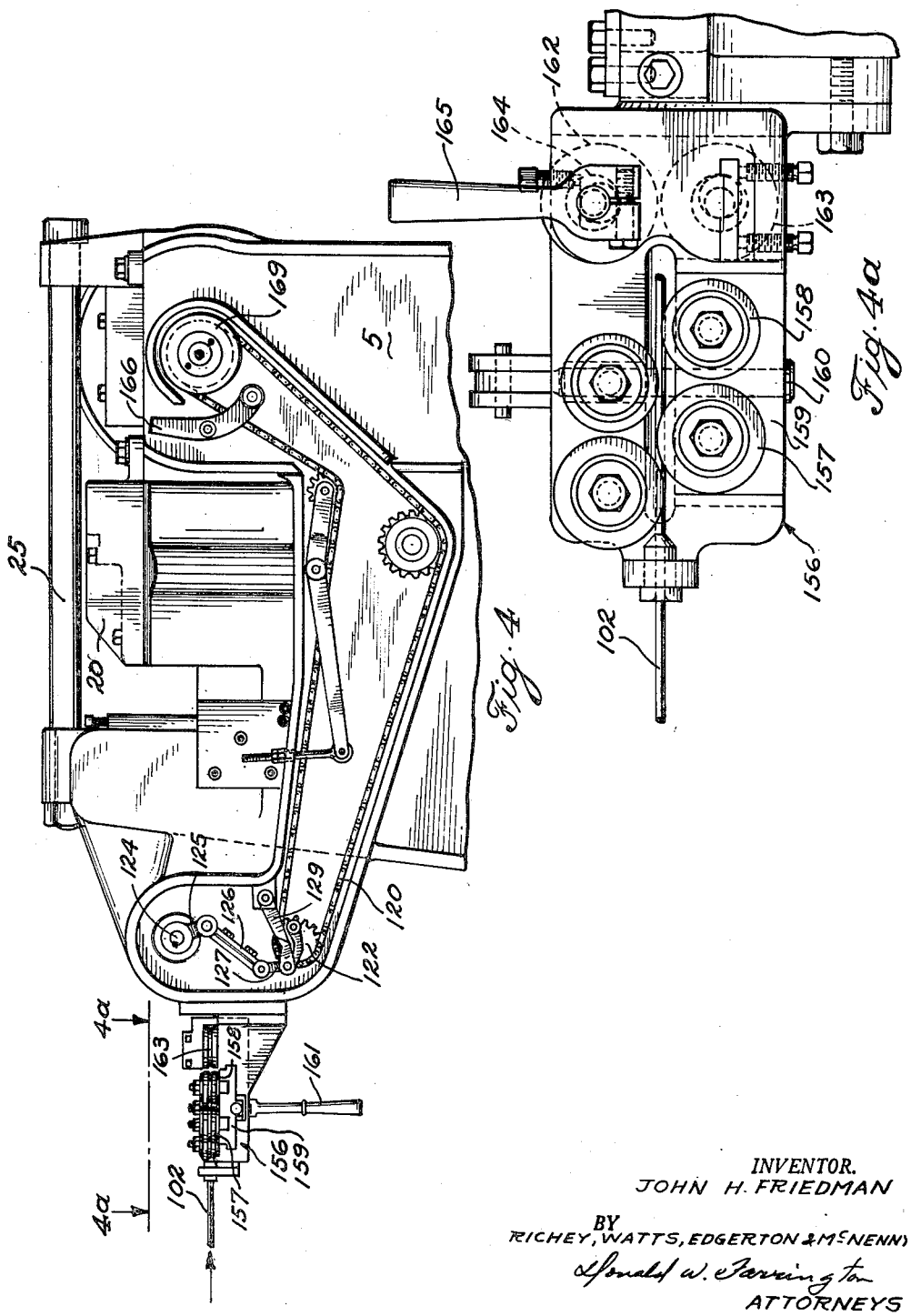
INVENTOR.
JOHN H. FRIEDMAN
BY
RICHEY, WATTS, EDGERTON & McNENNY
ATTORNEYS

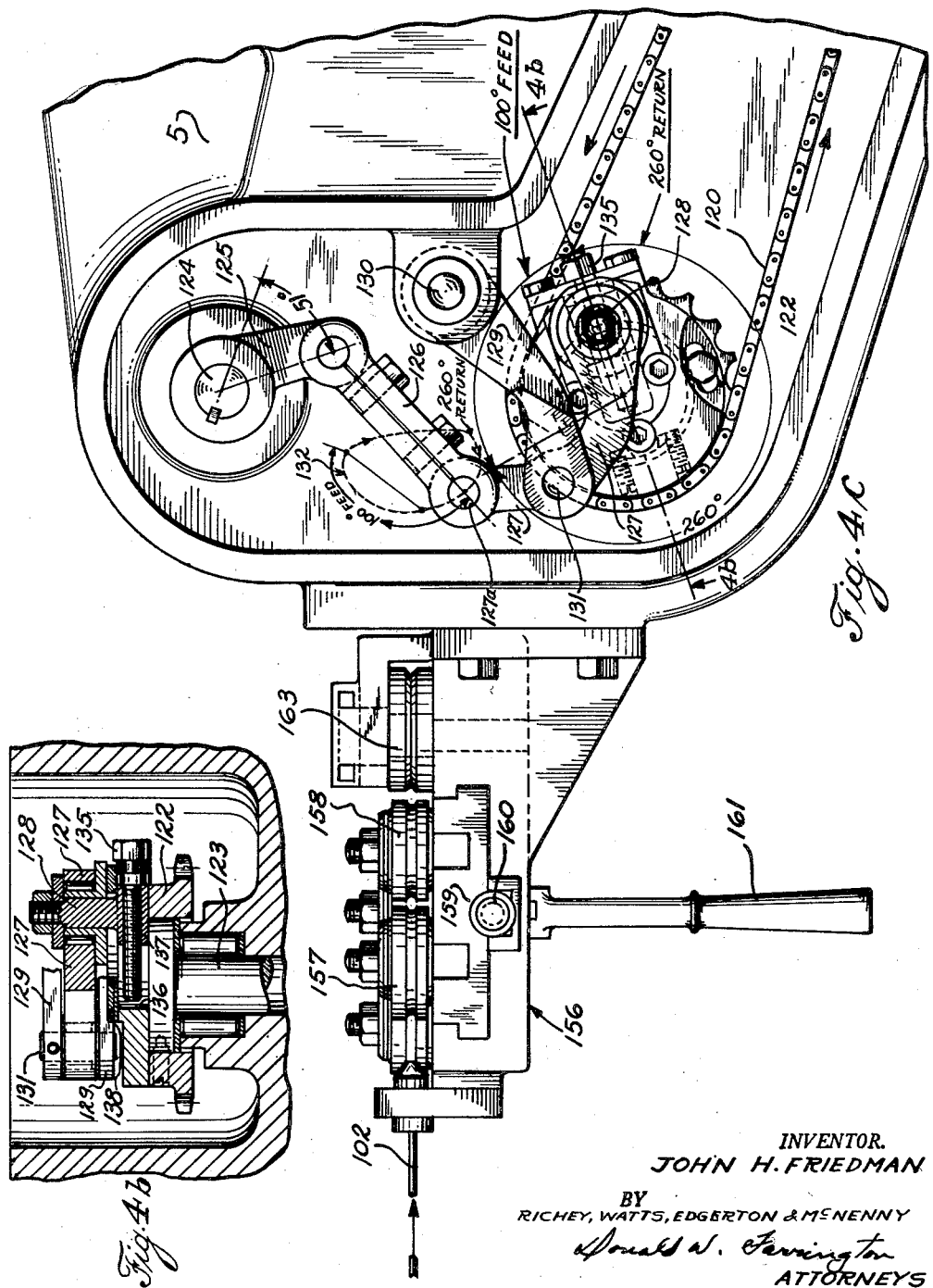

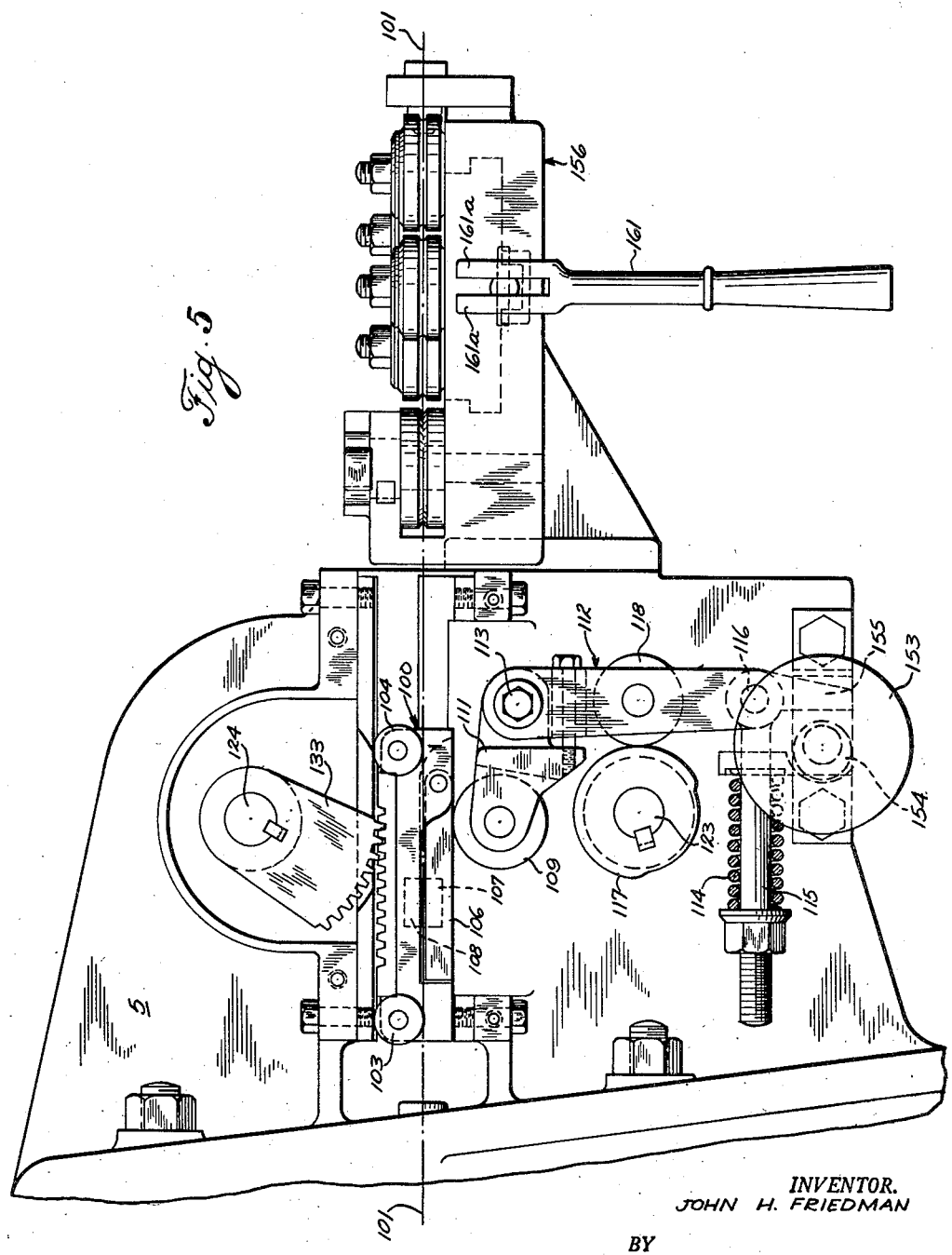

INVENTOR.
JOHN H. FRIEDMAN
BY
RICHEY, WATTS, EDGERTON & McNENNY
ATTORNEYS

July 30, 1957  J. H. FRIEDMAN  2,800,669
PIVOTALLY OPERATED CUTTERS IN A NAIL MAKING MACHINE
Filed Sept. 19, 1952  16 Sheets-Sheet 8
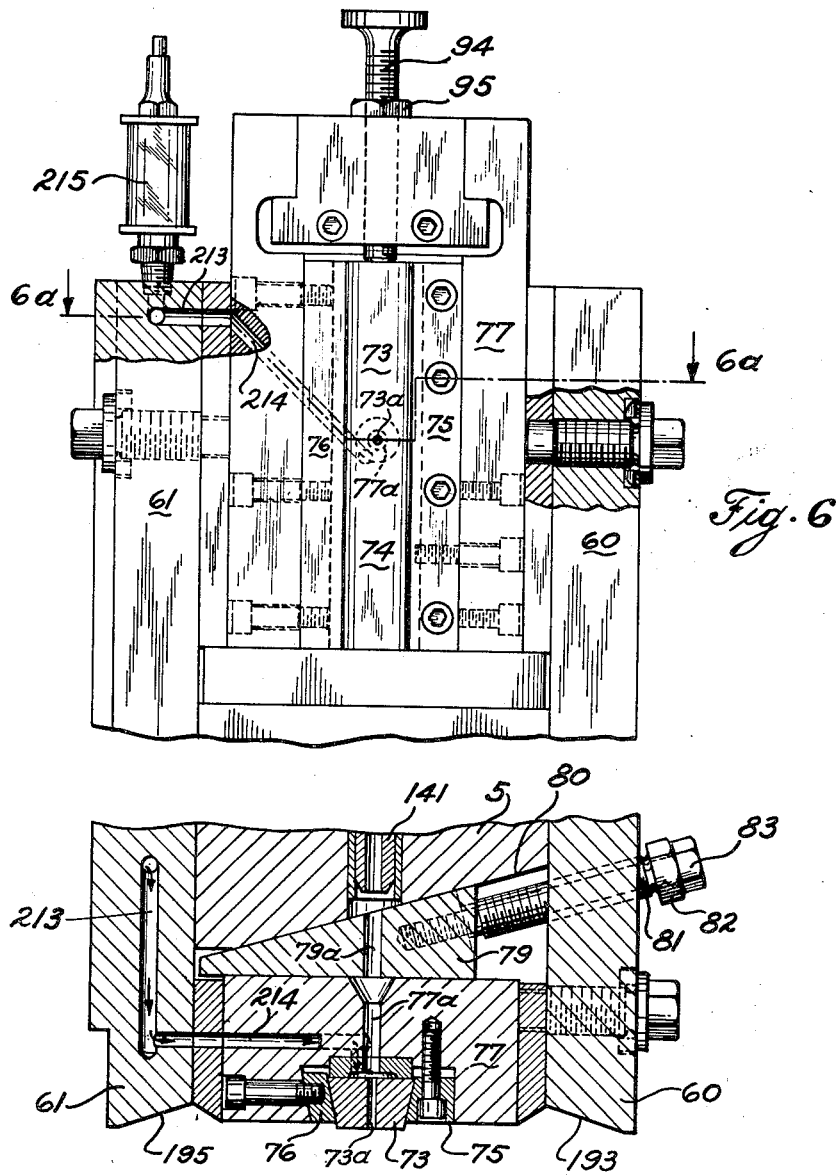
INVENTOR.
JOHN H. FRIEDMAN
BY
RICHEY, WATTS, EDGERTON & McNENNY
ATTORNEYS July 30, 1957 J. H. FRIEDMAN 2,800,669
PIVOTALLY OPERATED CUTTERS IN A NAIL MAKING MACHINE
Filed Sept. 19, 1952 16 Sheets-Sheet 9

INVENTOR.
JOHN H. FRIEDMAN
BY
RICHEY, WATTS, EDGERTON & McNENNY
ATTORNEYS

INVENTOR.
JOHN H. FRIEDMAN
BY
RICHEY, WATTS, EDGERTON & McNENNY
ATTORNEYS

July 30, 1957 J. H. FRIEDMAN 2,800,669
PIVOTALLY OPERATED CUTTERS IN A NAIL MAKING MACHINE
Filed Sept. 19, 1952 16 Sheets-Sheet 11

INVENTOR.
JOHN H. FRIEDMAN
BY
RICHEY, WATTS, EDGERTON & McNENNY
ATTORNEYS

July 30, 1957    J. H. FRIEDMAN    2,800,669
PIVOTALLY OPERATED CUTTERS IN A NAIL MAKING MACHINE
Filed Sept. 19, 1952    16 Sheets-Sheet 12

INVENTOR.
JOHN H. FRIEDMAN
BY
RICHEY, WATTS, EDGERTON & McNENNY
Donald W. Farrington
ATTORNEYS July 30, 1957 J. H. FRIEDMAN 2,800,669
PIVOTALLY OPERATED CUTTERS IN A NAIL MAKING MACHINE
Filed Sept. 19, 1952 16 Sheets-Sheet 13

INVENTOR.
JOHN H. FRIEDMAN
BY
RICHEY, WATTS, EDGERTON & McNENNY
ATTORNEYS

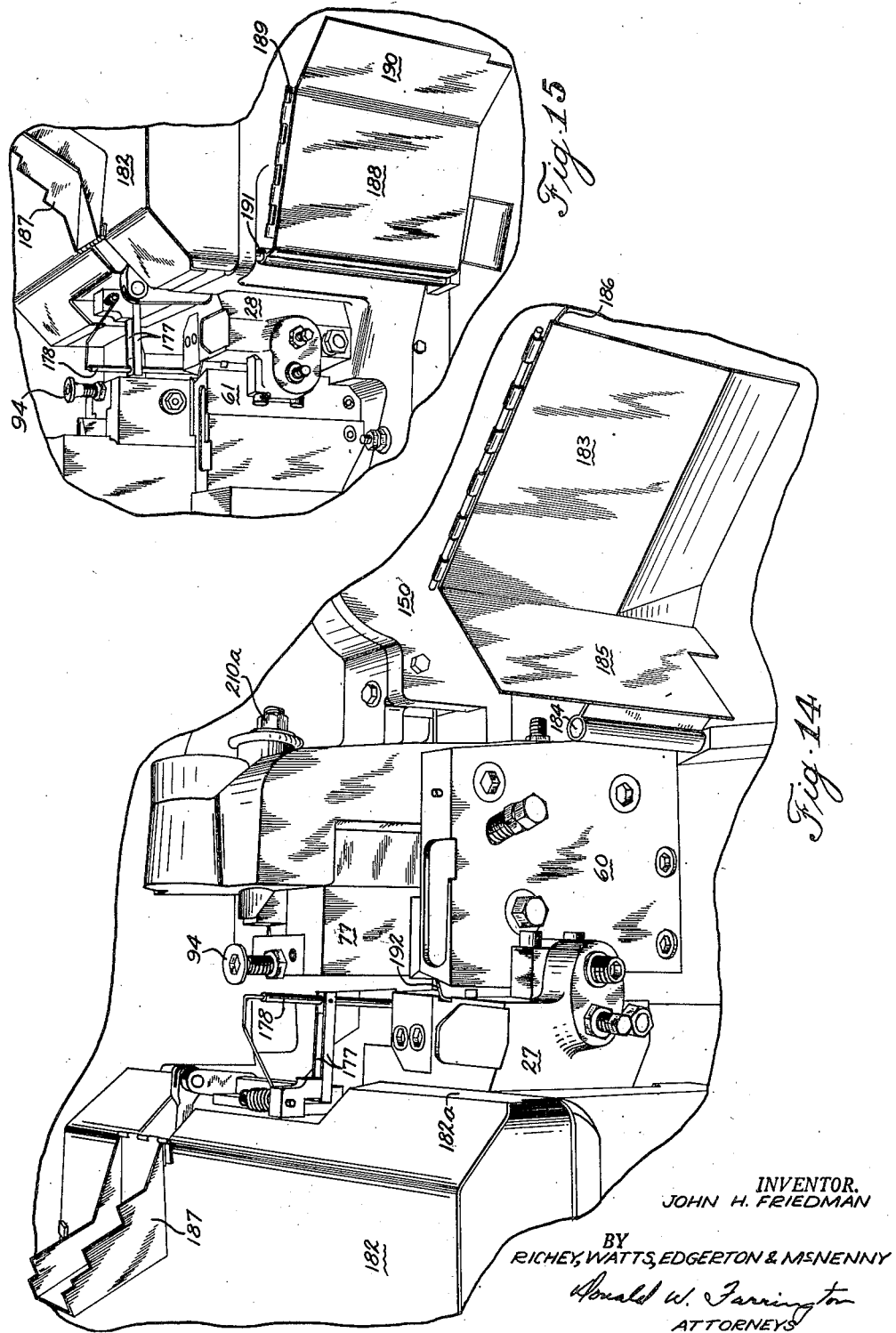

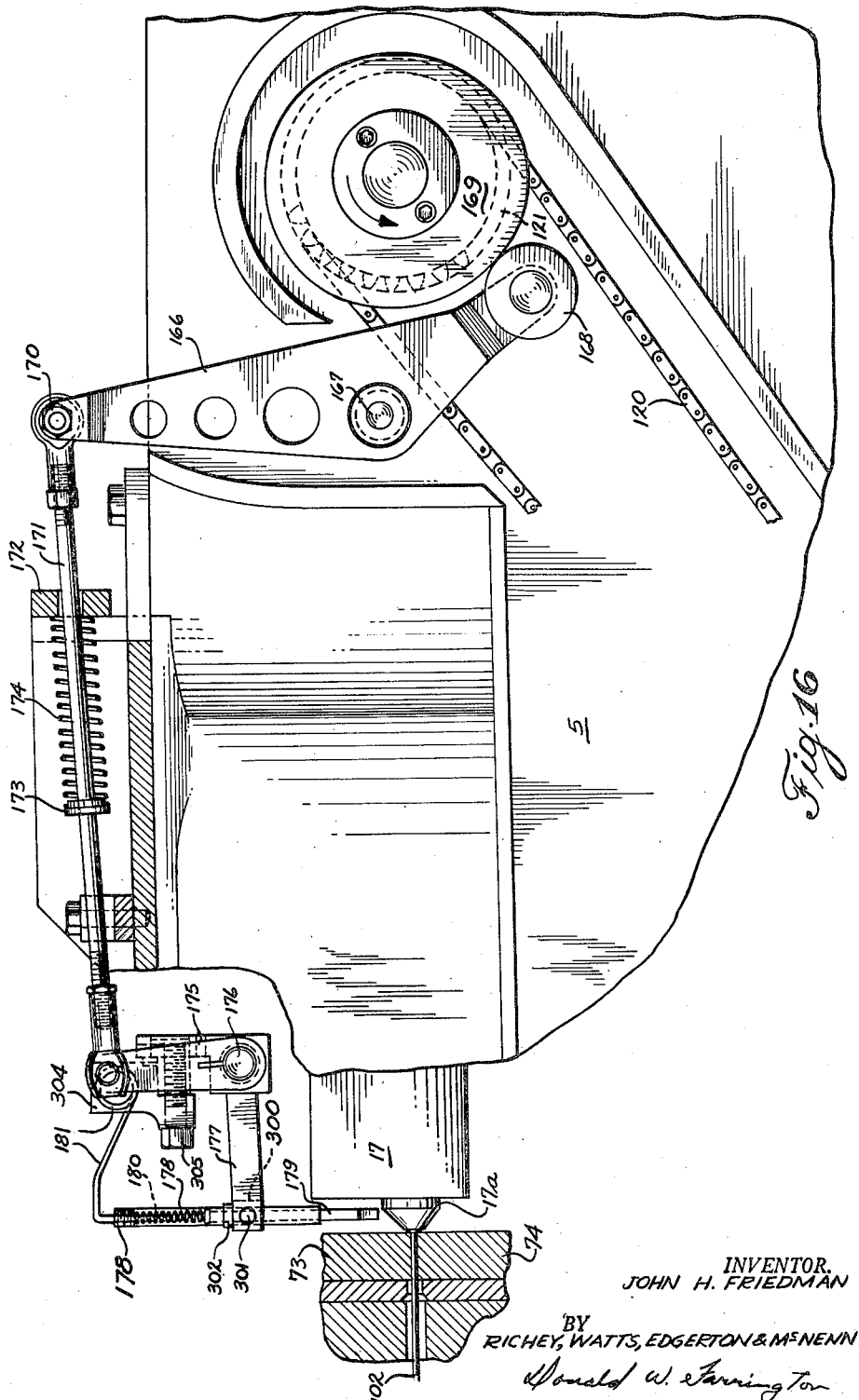

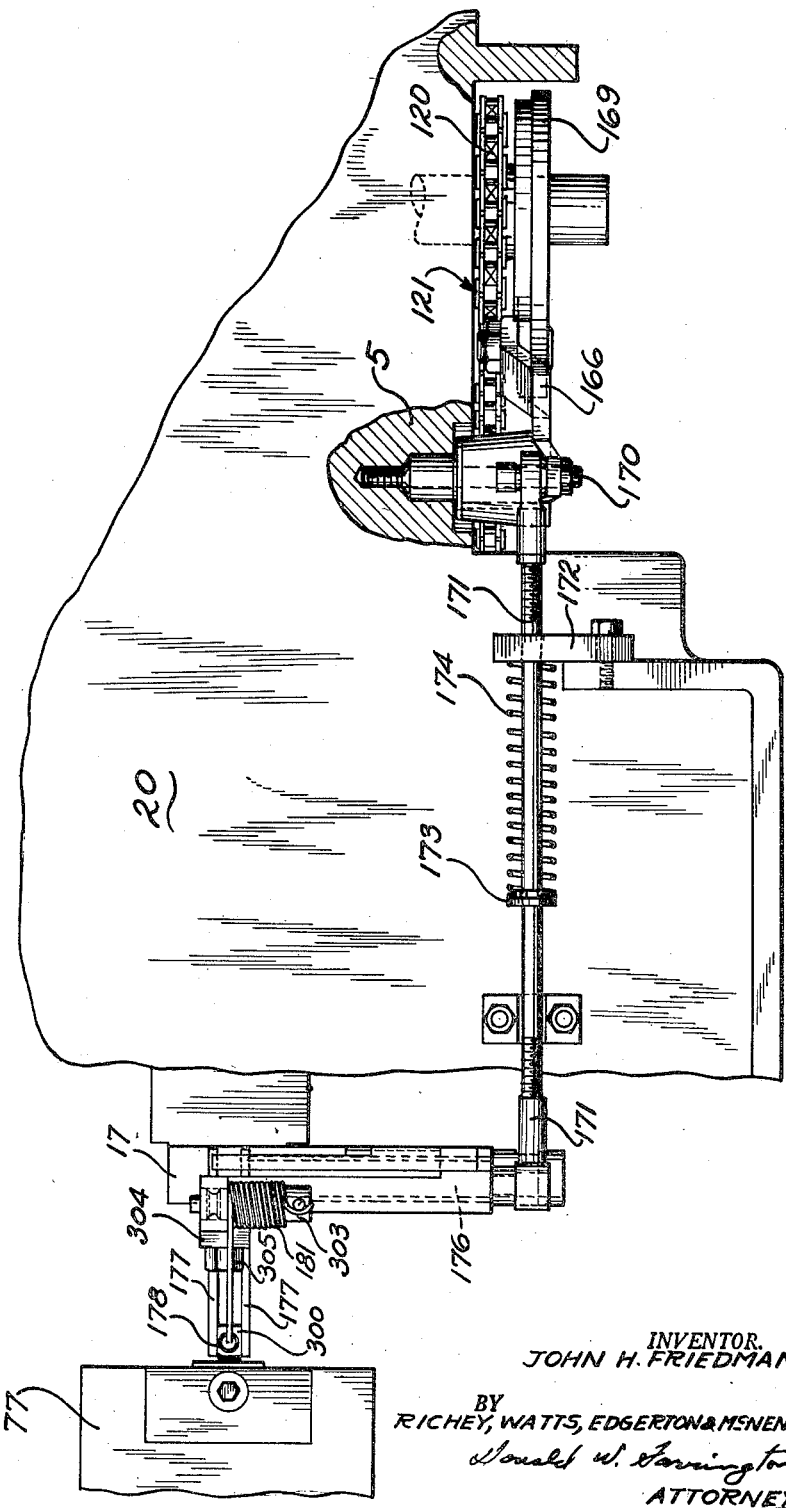

United States Patent Office 2,800,669
Patented July 30, 1957

2,800,669

PIVOTALLY OPERATED CUTTERS IN A NAIL-MAKING MACHINE

John H. Friedman, Tiffin, Ohio, assignor to The National Machinery Company, Tiffin, Ohio, a corporation of Ohio Application September 19, 1952, Serial No. 310,461

3 Claims. (Cl. 10—50)

This invention relates to a machine for making nails and, more particularly, to that type of machine wherein wire stock is progressively advanced between stock gripping dies, headed and further advanced and cut by relatively moving cutting knives and thereafter discharged from the machine.

Among the objects of the present invention is to provide a nail machine wherein the parts are constructed and arranged so as to produce more perfect nails and at a faster rate than has been obtainable with the machines of the prior art.

More specifically it is an object of the present invention to provide a nail machine wherein the cutters are mounted on the frame and operated by a toggle connection with the header slide so that the accelerating and decelerating movements of the cutters are more accurately controlled and the cutter operation is suited to a high speed production.

It is also a more specific object of the present invention to provide a nail machine with an improved feed mechanism which will feed positively and accurately and which will not adversely affect the stock being fed.

It is also an object of the invention to provide a feed mechanism according to the preceding object with a novel, quick advance and slow return motion of the feed.

It is a further object of the present invention to provide a nail machine having a feed mechanism according to the two preceding objects which will automatically stop the machine in the event the stock should be jammed in the grip dies.

It is a further object of the present invention to provide a nail machine wherein that area of the machine in which the cutting takes place is enclosed or shrouded so that the metal chips or whiskers resulting from the cutting can not enter the moving parts of the mechanism so as to adversely affect the machine operation.

Further objects and advantages of my construction will appear as the detailed description of the machine proceeds and with the explanation of the appended drawings wherein:

Fig. 1 shows the nail machine in its entirety;

Fig. 2 is a sectional view taken on a vertical plane through the center line of the nail machine;

Fig. 3 is a perspective view looking down into the machine with the top bearing cap and other parts removed;

Fig. 4 is a side elevation taken at the right hand side of the machine, showing the drive for the feed mechanism;

Fig. 4a is an enlarged plan view showing the straightening roll arrangement for straightening the stock entering machine;

Fig. 4b is a sectional showing of a part of the feed mechanism taken on the plane 4b—4b of Fig. 4c;

Fig. 4c is an elevation in detail showing the linkage drive for the feed mechanism;

Fig. 5 is an elevation taken at the left hand side of the machine showing the feed mechanism for advancing the stock into the machine;

Fig. 6 is an elevation looking into the die breast showing the grip dies and related mounting details;

Fig. 6a is a view taken on the plane 6a—6a of Fig. 6;

Fig. 14 is a perspective view taken at the left hand side of the machine showing the shrouding arrangement for confining the chips and also showing a portion of the nail ejector;

Fig. 15 is a perspective view taken at the right hand side of the machine, showing the shrouding and a portion of the nail ejector mechanism;

Fig. 16 is an elevation with parts in section, showing the nail ejector and the drive therefor;

Fig. 17 is a plan view of the nail ejector apparatus and drive therefor.

Figure 5A:
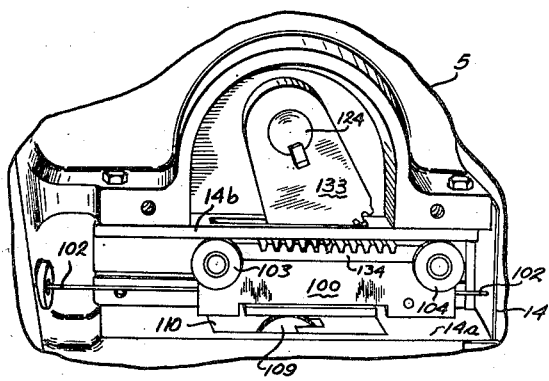
Fig. 5a is a perspective view of a portion of the feed mechanism with the stock gripping members in a retracted position.

For a general understanding of the construction and operation of my invention reference may be had to Fig. 1 wherein the nail machine 5 is mounted on a base 6 and is provided at the left hand side thereof with a discharge chute 7 which terminates above an inclined nail conveyor 8. A supply of wire stock is illustrated as at 9 and is preferably supported on a reel mechanism 10 which advances the wire stock to the machine according to the tension therein reflected by the tension in the stock 11. The stock reel support for advancing the wire stock to the machine and the conveyor 10 for conveying finished nails away from the machine form no essential part of the present invention and are therefore not described here in detail. A control box 12 carrying suitable starting and stopping switches is mounted on the machine in a position convenient to the operator. The machine is preferably driven by an electric motor or the like (not shown) which is belted or otherwise operatively connected to the flywheel 13 at the left-hand side of the machine. The feed mechanism for intermittently advancing the wire stock 11 is indicated in its entirety as at 14 and as will be understood by those skilled in the art, a reciprocating header slide is driven by a crankshaft which header slide upsets a head on the end of the wire stock within the machine. The stock is thereafter advanced by the feed mechanism into alignment with cooperating cutters for cutting the wire stock and at the same time forming a point by the cutting operation. The cutting is carried out at a sufficient distance from the die breast so as to leave a portion of the stock projecting from the die breast for the next nail head to be upset by the header slide.

The rotation of the flywheel 13 is transmitted to a crankshaft arranged transversely of the machine at the rear thereof and, as shown in the sectional view of Fig. 2, the crankshaft is provided with an eccentric crank portion 15 and the connecting rod 16 transmits the crank motion to the header slide indicated in its entirety as at 17. The header slide is guided in its reciprocating movement by forward bearings 18 and 19 disposed above and below the header slide. The bearings 18 and 19 are carried by a removable cap member 20 and transverse bed frame member 21 respectively. To insure accurate header slide action spaced bearings 22 are carried at the rear end of the header slide on a widened header slide portion 23 which overhangs the crank. A wristpin 24, arranged transversely of the header slide connects the rod 16 to the header slide. Preferably the upper and lower bearings 18 and 19 are proportioned and arranged as shown in the sectional view of Fig. 13 and the rear bearings are similarly shaped as shown as 22a in Fig. 3. As will also be observed by reference to Fig. 3, the rear bearings 22a are spaced from each other substantially the full width of the machine so that the header slide is characterized by accurate reciprocating movement.

The hammer 17a carried by the header slide 17 is mounted in the header slide for longitudinal adjustment. To effect such adjustment the header slide is provided with a bore 196, in which is mounted a wedge 197 backed up at one end by adjusting plug 198 and at the other end by adjusting plug 199 so that by backing off on one plug and drawing up on the other plug the wedge 197 is moved transversely of the header slide in the bore 196. A pin 200 is mounted in an axial bore and has at one end thereof a wedge face 201 complementary to the face of the wedge 197. The other end of the pin 200 has a threaded aperture 202 to receive a tool for withdrawing the pin 200. Pin section 204 is internally threaded at its forward end as at 205 to receive a tool for withdrawing the pin 204. The aligned hammer sections 17a—204—200 are disposed within the header slide sleeve 207 which is retained within the axial bore of the header slide by a clamp screw 208.

To insure that the bed frame will not be stretched by the pressure of the header slide in its upsetting action, a tie bar 25 is arranged longitudinally at the top of the machine above the bearing member 20. The tie bar is prestressed by drawing up the nut 26 and thus a rigid boxlike structure is provided with the minimum of weight and the maximum of convenience and accessibility to the moving parts of the machine.

The cutter bars 27 and 28 for shearing and pointing the nails include vertically spaced ears 29 and 30 and 31 and 32 respectively. The ears are so shaped that they may be overlapped on each other in the vertical plane of the header slide and in such overlapped position are pivoted to each other by the pins 33 and 34. The pin 33 is anchored in the cap member 20 and the pin 35 is anchored in the bed frame section 21 underneath the header slide. As will be observed from reference to Figs. 2 and 3, the ears 29 and 30 of the left hand cutter bar 27 are spaced from each other a greater vertical distance than the ears 31 and 32 of the right hand cutter bar 28 so that the ears 29 and 30 embrace and overlap the corresponding ears 31 and 32. The mounting of both cutter bars on vertically aligned pivot pins 33 and 34 above and below the header slide permits the use of a cutter bar actuating mechanism that eliminates deflection under load which would adversely affect accuracy and speed of operation.

Figure 9:
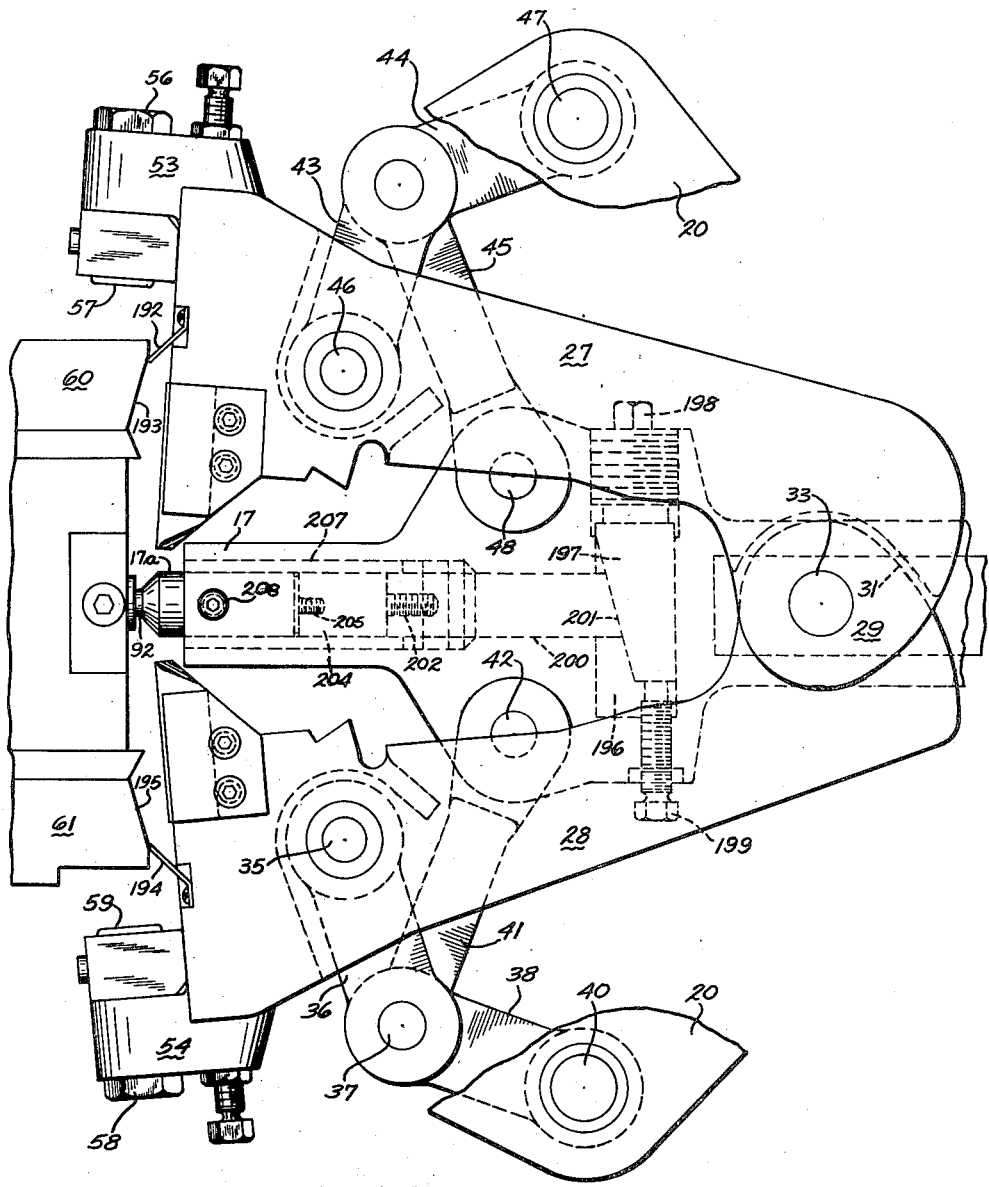
Fig. 9 is a plan view similar to Fig. 8, showing the header slide fully advanced and the cutter bars retracted from cutting position.
Figure 13:
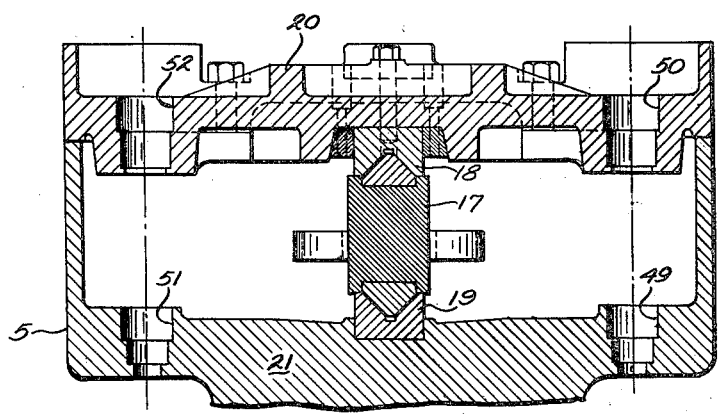
Fig. 13 is a sectional elevation taken on the plane 12a—12a of Fig. 12.

The movement of the cutter bars during the operation of the machine is effected by means of the header slide through a novel toggle arrangement. Referring particularly to Figs. 3 and 9 and to the right-hand cutter bar 28, the cutter bar is provided near its free end with a vertically disposed pin 35 and pivoted on this pin is a toggle link 36 which is in turn pivoted by means of pin 37 to a toggle link 38. The other end of toggle link 38 is pivoted as at 40 to the frame. A third toggle link 41 is pivoted at the juncture between the links 36 and 38 at one end and pivoted at its other end as at 42 to the header slide. In this connection it will be noted that the cutter bar 28 is slotted or cut away to provide a horizontal passageway for the toggle links 36 and 41 which operate through the cutter bar. The left hand cutter bar 27 is similarly provided with toggle links 43, 44, and 45 connected to the cutter bar as at 46, the bed frame as at 47 and the header slide as at 48. The vertical pivot pin 40 for the right hand cutter bar 28 is journalled at its lower end in the bearing 49 of the bed frame as best shown in Fig. 13, and the upper end of said pin is journalled in the cap member 20 in the bearing 50. Similar bearings are provided for the pin 49 at the left-hand side of the bed frame and cap members as at 51 and 52.

Figure 8:
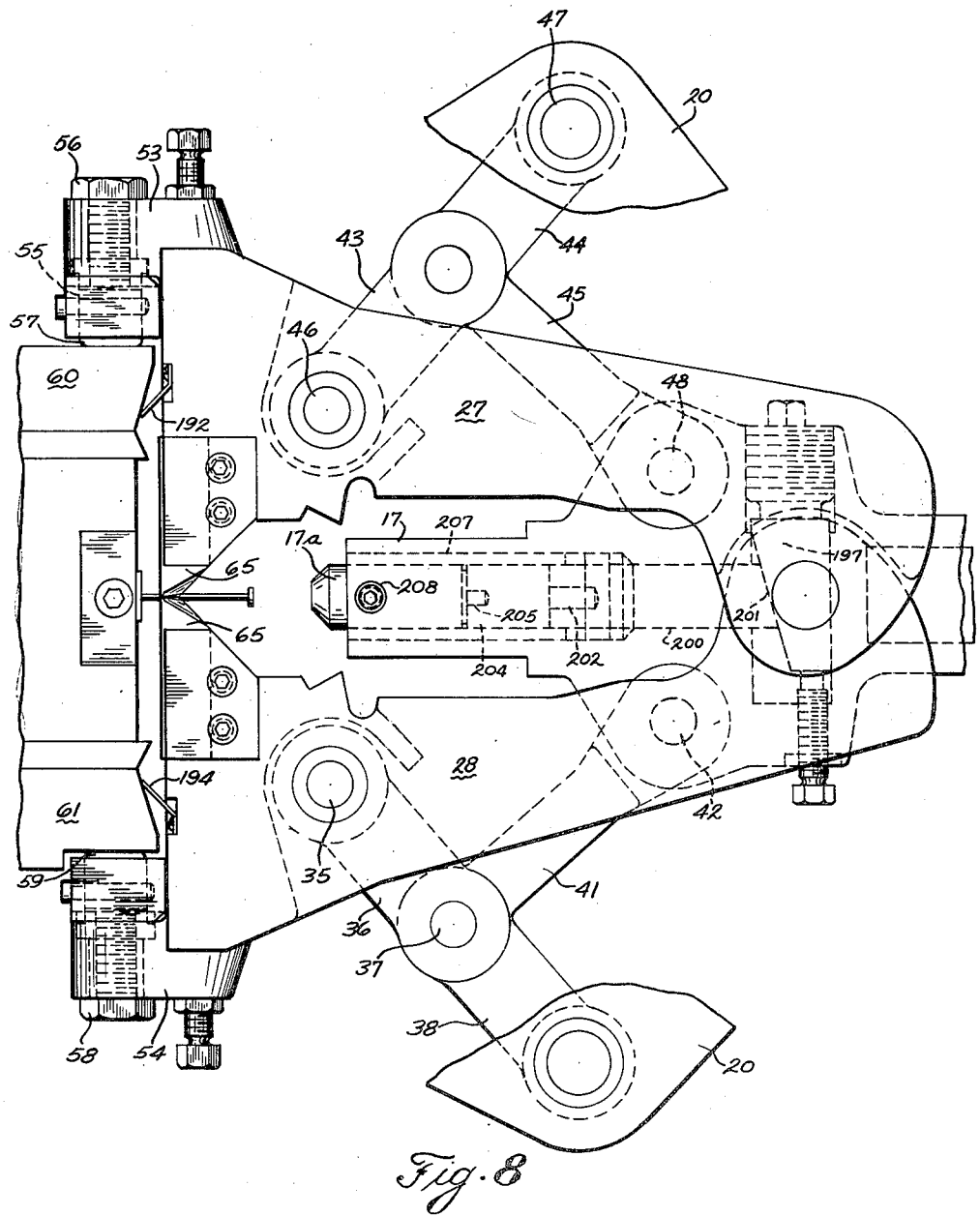
Fig. 8 is a plan view showing the cutter bars and the toggle connections between the cutter bars and the header slide with the header slide in back center position.
Figure 12:
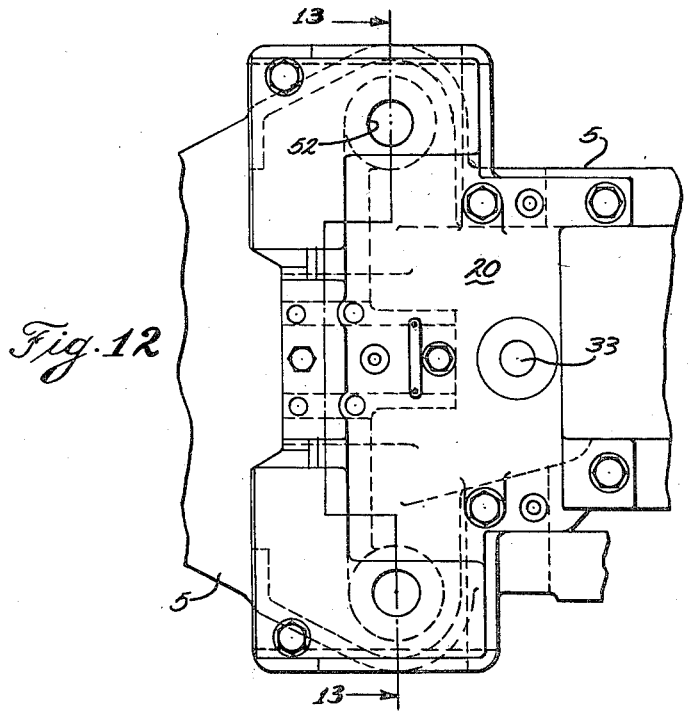
Fig. 12 is a plan view showing the top bearing cap for the cutter bar pivots.

The above-described arrangement of toggle connections between the header slide and the cutter bars is such that when the header slide is retracted to its maximum back center position the toggle links 43—44 and 36—38 are brought into dead center positions and that when the header slide is advanced to maximum forward position (as illustrated in Fig. 9) the same toggle links are brought into angular positions with respect to each other, and the cutter bars are withdrawn from the cutting position illustrated in Fig. 8. The mounting of the cutter bars for pivotal movement upon pivot pins above and below the header slide provides a rigid support for the cutter bars and the toggle arrangement provides for improved accelerating and decelerating cutter bar motion which contributes to the over-all high speed operation of the machine. The deceleration of the bars 27 and 28 as the cutters approach each other is particularly important and in my machine is characterized by an operation wherein the cutter knives will not hit and damage each other even when the machine is running idle, that is, with no stock between the knives. This means that the knives may be accurately adjusted with respect to each other so that they will cut a clean point on the nail and such adjustment may be maintained over long periods of operation. This appears to be due, at least in part, to the fact that the cap 20 forms with the bed frame a rigid box like structure (see Figs. 12 and 13) which through pins 40 and 47 takes about 80% of the cutting load. It appears that the control of the cutter bars in the prior art machines in their closing movement as by cams and eccentrics, namely by the crankshaft, imposed certain limitations on such prior art machines which adversely affected the maximum speed of operation of the machine. The cutter bar drive in my machine is such that only about 20% of the cutting load is taken by the main header slide and main crank of the machine and this load is taken on the back stroke of the slide.

The outer free end of each of the cutter bars is provided with an integrally formed extension which carries a bumper engaging the side face of the die breast, the left-hand cutter bar 27 having the extension 53 and the right-hand cutter bar 28 having the extension 54. The extension 53 is provided with an internal bore 55 and an adjusting screw 56, arranged to bear against a hardened steel plunger or pad 57. The right-hand cutter bar 28 is similarly adjusted with respect to the side of the die breast by the adjusting nut 58 and the hardened steel plunger or pad 59. The pads 57 and 59 positively limit the approach of the cutter knives to each other in adjusted cutting position and the massive side plates 60 and 61 of the die breast absorb the impact and prevent such impact from transmission through the cutter knives to the wire.

Figure 11:
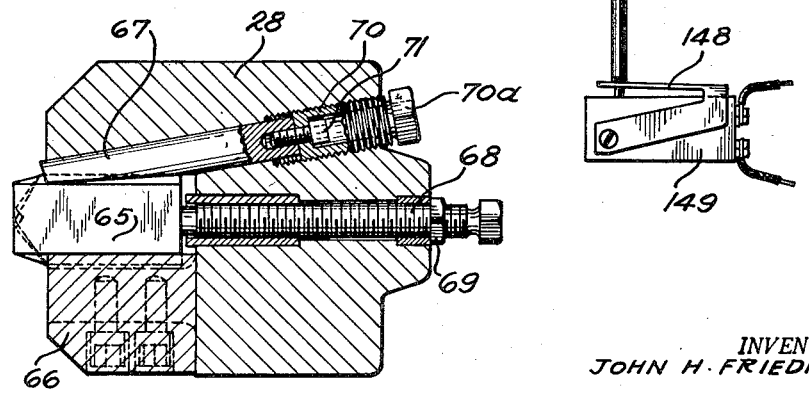
Fig. 11 is an elevation with parts in section, showing the mounting of the knife in the cutter bar.

To cut the nail free of the wire stock and at the same time form a point on the nail, each of the cutter bars is provided with a knife 65 mounted as shown in detail in Fig. 11. The cutter knife 65 is flat on that side adjacent the heading die and on that side toward the header slide. The top and bottom faces of the knives are beveled or sloped away from the face adjacent the heading die so as to provide a knife of wedge form, one side of the wedge being held by a wedge block 66 and the other side of the wedge face being held by sliding wedge 67. The knife 65 may be adjusted laterally with respect to the cutter bar by the adjusting screw 68 and lock nut 69. The sliding wedge 67 abuts against a threaded plug 70 and is held thereagainst by a cap screw 71. The exposed end of the plug 70 is provided with a polygonal head 70a so that the plug may be advanced or withdrawn in the threaded bore of the cutter bar 28. By means of the three adjustments described in connection with the mounting of the knife 65 the knife may be adjusted vertically and horizontally with respect to the cutter bar and firmly locked in adjusted position. As will be understood by those skilled in the art, the cutting edge of the knife 65 is notched and beveled in accordance with the point desired on the nail being made. In the form of the knife shown in the application, the flat tapered sides of a four-faced nail point are formed.

To grip the nail stock securely on the die breast while it is being headed and while it is being cut, cooperating grip dies 73 and 74 are mounted on the face of the die breast, 73 being the uppermost of the grip dies and being fixed to the die breast whereas 74, the lower grip die, is vertically movable within narrow limits. The forward face of each of the grip dies is narrower than the rear face thereof (as best shown in Figs. 6 and 6a) so that overhanging wedges 75 and 76 may be employed to lock the fixed grip die 73 in the die breast 77. Preferably the movable die 74 has the same contour and is guided in its vertical movements between the wedges 75 and 76 and the grip die 74 is normally urged to the lower limit of its movement by a spring-pressed pin 78 carried near the lower edge of the die breast 77. The die breast 77 is backed up by a wedge 79 which may be adjusted transversely of the sloping face 80 on the bed frame 5 in back of the die breast. A sleeve 81 having a hex head 82 is threaded into the left-hand plate 60 on the left-hand side of the die breast. A cap screw 83 extends through the sleeve 81 and is threaded into the wedge 79 that backs up the die breast 77. It will be understood by reference to Figs. 6a and 10 that by moving the wedge plate 79 transversely of the die breast with adjusting means 82 and 83 the die breast in its entirety may be moved fore and aft with respect to the bed frame and with respect to the header slide. It will be understood that the grip dies 73 and 74 are bored out as at 73a and that the die breast 77 is bored out as at 77a and that wedge plate 79 is bored out as at 79a to accommodate the wire stock being advanced into the machine.

The die breast 77 is pulled towards the bed frame 5 by longitudinally extending bolts 210 and 211, extending through the bed frame immediately above and below the die breast. The head of the bolt 210 is in the form of a wedge which bears against the top face of the die breast and drawing up of the nut 210a cams or wedges the die breast in place. At the bottom of the die breast the head of the bolt 211 is preferably in the form of a hook which engages a groove at the lower edge of the die breast 77 so that, by drawing up the nut 211a along with the nut 210a the die breast is securely fixed against the bed frame through the wedge block 79 above described. It will be understood that adjustments of the nuts 210a and 211a is accomplished by corresponding transverse adjustment of the wedge plate 79 so that the die breast 77 in its entirety may be adjusted fore and aft of the machine.

Figure 10:
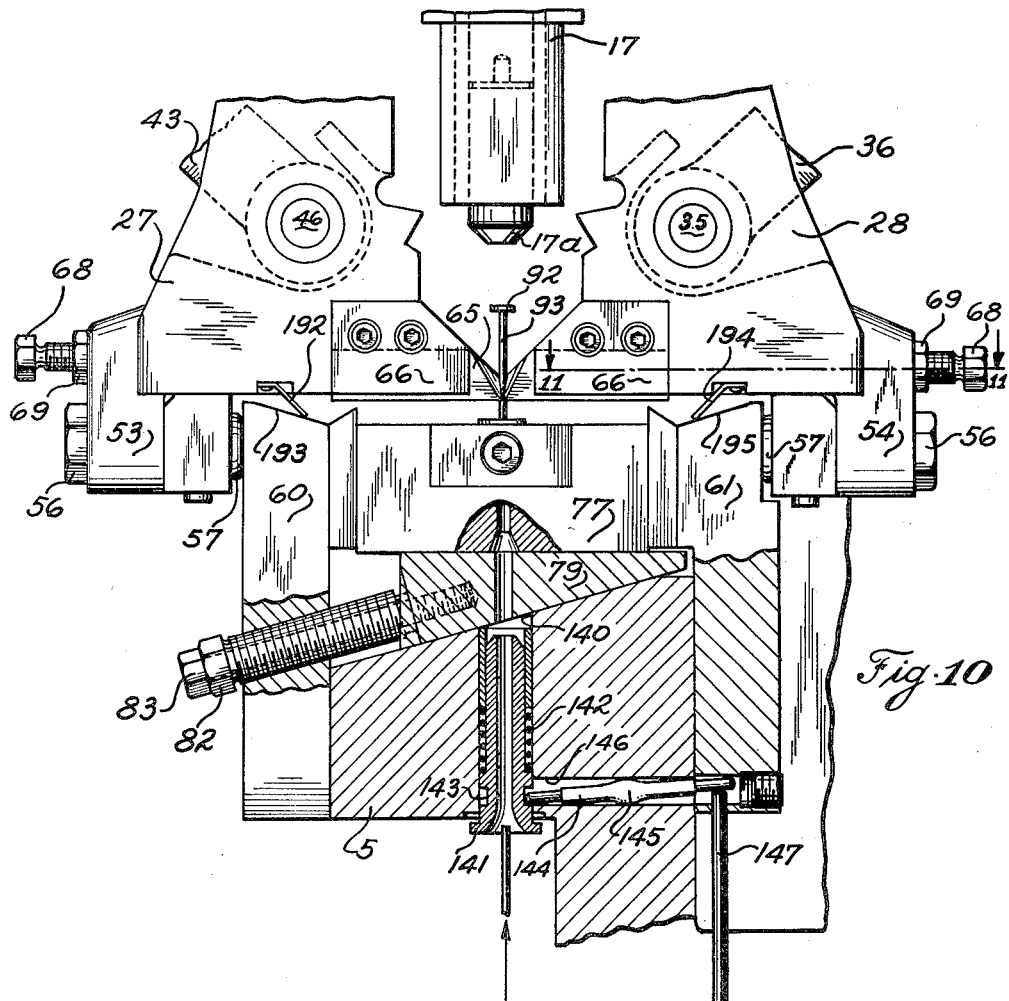
Fig. 10 is a plan view with parts in section, showing the safety shutoff.

To operate the movable grip die 74 a lever 84 is pivoted as at 85 within the bed frame directly beneath the header slide. The lever 84 is normally urged in counter-clockwise direction (as viewed in Fig. 2) by a heavy coil spring 82 and a cam roller 87 as the rear end of the lever bears against a cam 88 affixed to the crankshaft. The forward end of the lever 84 carries an adjustable cup member 89 vertically disposed at 90 which bears at its upper rounded end against a sliding pin 91 and the pin 91 in turn bears against the lower end of the movable grip die 74. The cam 88 is preferably contoured so that the stock is firmly gripped between dies 73 and 74 when the head 92 is upset on the nail as shown in Fig. 9 and that the stock is also firmly gripped between the grip dies when the nail 93 is being cut as shown in Fig. 10. As the header slide retracts from the die breast after the heading operation, the contour of the cam 88 releases the grip die 74 so that the stock may be advanced by the feed mechanism without restraint on the stock in the grip dies. The grip dies may be adjusted vertically by means of the adjusting screw 94 and lock nut 95 and the member 89 and the lock nut 96 which are carried by the forward end of the grip lever 84.

Figure 5B:
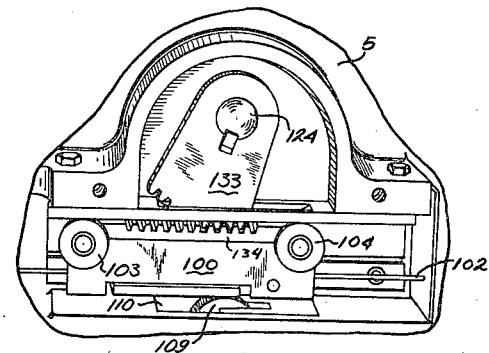
Fig. 5b is a perspective similar to Fig. 5a with the stock gripper mechanism advanced.
Figure 5C:
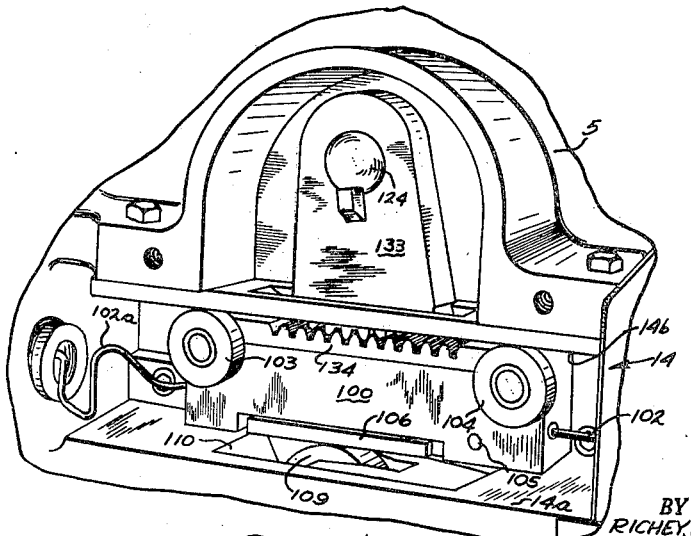
Fig. 5c is a perspective view of the feed apparatus illustrated in Figs. 5a and 5b showing the operation of the safety device in the event of a jam in the machine.

Preferably the stock is intermittently advanced into the machine according to my invention by means of a "come-along" feed mechanism wherein a reciprocating "come-along" carriage, indicated in its entirety as at 100 in Fig. 5, grips the wire stock and moves it forward through the die breast a predetermined amount and then returns to again grip the wire stock and carry it forward. The center line of the wire stock being advanced into the machine is indicated as at 101 in Fig. 5 and the wire stock is indicated as at 102 in Figs. 5a, 5b and 5c. The carriage 100 is reciprocated within a housing 14 which is provided with a bottom wall 14a and a top wall 14b. The carriage is provided with rollers 103 and 104 which bear against the top wall 14b on the housing. Pivoted as at 105 in the carriage is a bar 106 which carries a hardened steel block 107 adapted to engage the underside of the wire stock to be advanced. A cooperating hardened steel block 108 is carried in the carriage proper immediately above the block 107. The pivoted bar 106 rides, during the reciprocation of the carriage, on a roller 109 which is exposed through a slot in opening 110 at the bottom wall 14a of the housing.

To move the roller 109 in a vertical direction and thus apply gripping pressure across the blocks 107—108, the roller 109 is pivoted on the arm 111 of a bell crank 112. The bell crank is urged about its pivot 113 in a clockwise direction by means of a spring 114 pulling on rod 115 pivoted to the lower end of the bell crank as at 116. To intermittently release the gripping effect across the blocks 107—108 a cam 117 is arranged to bear against the roller 118 mounted on the lower arm of the bell crank 112. The cam 117 is rotated by means hereinafter described and has high and low areas arranged so that as the "come-along" carriage 100 advances the spring 114 is effective to grip the stock and thus carry the wire stock into the machine. Similarly, the high portions of the cam 117 release the spring pressure and thus the gripping pressure on the stock when the "come-along" carriage 100 is being retracted along the stock.

The drive for the stock feed is preferably accomplished by an arrangement such as that illustrated in Fig. 4 wherein a chain 120 is driven by a sprocket 121 on the crankshaft at the right-hand side of the machine. A forward sprocket 122 is driven by the chain 120 and the transverse shaft for sprocket 122 is the shaft 123 appearing on the left-hand side of the machine to drive the "come-along" cam 117 heretofore described. The sprocket 122, in addition to turning the shaft for cam 117, carries on its outer face (as best seen in Figs. 4b and 4c) a drive having linkage that oscillates the shaft 124 for the "come-along" feed mechanism.

In connection with the drive for the feed mechanism, it is here pointed out that following the heading of a nail the grip dies must be released and the stock advanced for the full length of a nail plus the stock required for the next head before the header slide reaches its maximum retracted position and the nail is cut. To coordinate such feed with the other operations to be performed, it is desirable that the advancing feed be accomplished during about 100° of the crankshaft movement. Since 180° of crankshaft movement is required for the heading operation and 180° is required for the retraction of the header slide, the advance feed is accomplished by the linkage mechanism shown in about 100° of crankshaft movement. The remainder of the crankshaft movement, namely about 260°, is employed for the return of the "come-along" carriage. Accordingly, the "come-along" feed is characterized by a quick advance and a slow return.

To accomplish the desired feed motion, an arm 125 is keyed to the oscillating shaft 124 and this arm is connected by link 126 to a bent arm 127 which is pivotally mounted on a crankpin 128 carried by the sprocket 122. The movement of the arm 127 is controlled by a link 129 pivoted as at 130 to the bed frame and as at 131 to arm 127. The link 129 is bifurcated at its free end as shown in Fig. 4b to embrace the sides of member 127 at pivot 131. Upon rotation of the crankpin 128 the pivot pin 127a on arm 127 describes a distorted elliptical path as indicated in the dotted line 132. The upper portion of the path 132 requires about 100° of crankshaft motion and results in an oscillation in a clockwise direction of the arm 125. The balance of the distorted elliptical path corresponds to about 260° of crankshaft motion and produces a clockwise movement of the arm 125 which corresponds to a retraction of the "come-along" feed mechanism.

Referring now to Figs. 5, 5a, 5b, and 5c, it will be noted that the left-hand end of the oscillating shaft 124 has keyed thereto a depending gear sector 133 which projects downwardly through a slot in the upper wall 14b of the housing 14 and meshes therein with a rack 134 carried by the "come-along" transfer 100. Thus by each revolution of the crankshaft the chain 120 effects a complete cycle of oscillation of the "come-along" feed which is characterized by a quick advance toward the die breast and a slow return and wherein the carriage moves freely with respect to the wire stock on the return and which grips the stock on the forward movement of the carriage. It will be understood by reference to Fig. 4b that the throw of crankpin 128 may be adjusted with respect to the sprocket 122 by means of the adjusting screw 135 so that nails of different length may be formed by varying the throw of the crankpin 128. The sprocket for this purpose is provided with a rectangular guideway 136 to receive the threaded block 137. The guideway has a cover plate 138 so that the threaded block 137 is retained normal to the face of the sprocket and may be moved inwardly and outwardly along the radius of the sprocket by means of the adjusting screw 135.

In the event of a jam of the wire stock in the grip dies or an undue restraint imposed upon the advance of wire stock in the die breast, the machine according to my invention is immediately stopped. The means for accomplishing this stopping of the machine is best illustrated in Figs. 10 and 5c. The bed frame 5 in alignment with the stock feed is provided with an enlarged bore 140 and slidably mounted in this bore is a stock guide quill 141. A spring 142 is arranged within the bore 140 so as to abut against an annular shoulder on the outside quill 141 and thus the quill is urged longitudinally of the bore 140 in a direction opposite to the direction of the stock feed within the quill. An annular groove 143 is provided in the quill and a pivoted pin 144 has one end thereof riding in the groove 143 of the quill. The pin 144 is enlarged as at 145 at its mid-portion so that it may rock or pivot in the transverse bore 146 formed in the bed frame. The other end of the rocking pin 144 bears against a longitudinally disposed pin 147 and said last-named pin in turn is operatively engaged with the actuating member 148 of a micro switch 149. The last-mentioned switch is in a relay circuit controlling the main motor for the machine so that, when the relay circuit is opened by movement of the switch member 148, the main motor for the machine is stopped.

In Fig. 5c I have illustrated the effect upon the wire stock 102a of a jam on the stock in the die breast or the grip dies of the machine. Since the stock is restrained from further advance through the die breast the advancing motion of the "come-along" 100 will cause the wire stock to bend and loop, as shown in Fig. 5c, and further causes the loop to move the quill 141 inwardly of the machine against the action of the spring 142. The last-described movement of the quill effects a rocking of the pin 144 and thus actuation of the switch 149 stopping the machine. This safety feature is particularly important where a number of machines according to the present invention are handled by a single operator. Normally the machine requires no attention by the operator except to renew the stock coil 9 but it is desirable to stop the machine as soon as there is a jam, preventing further advance of the coil stock.

Figure 7:
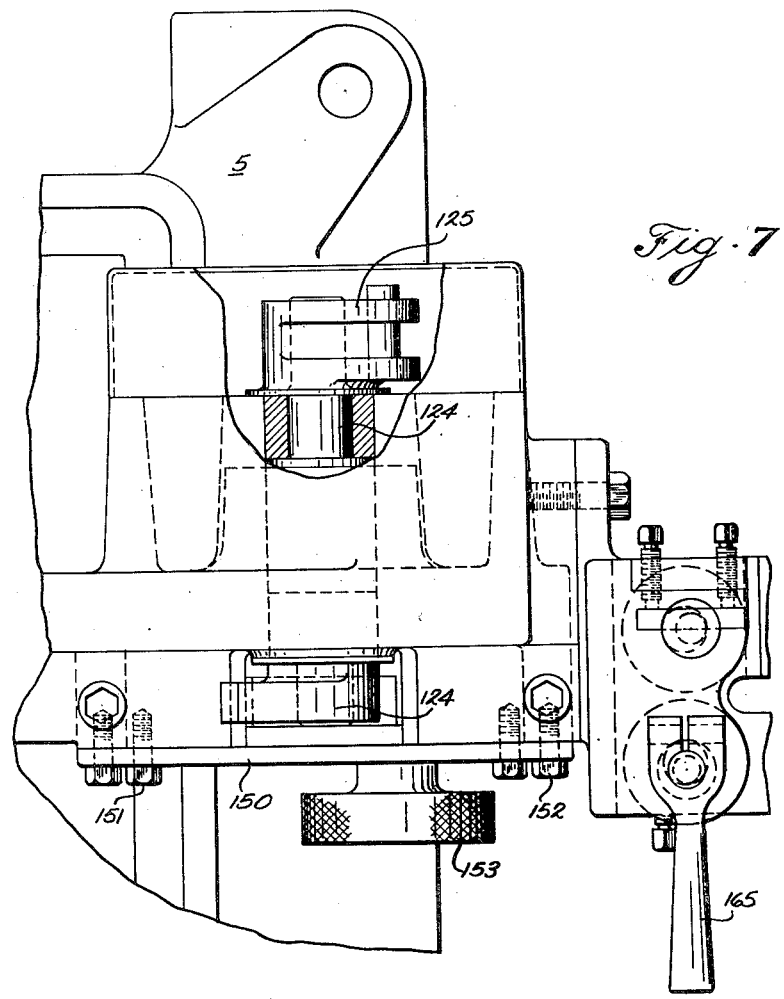
Fig. 7 is a plan view with parts in section of a transverse shaft forming a part of the feed mechanism.

During the normal operation of the machine, the come-along feed mechanism at the left-hand side of the machine is enclosed by a cover plate 150 as shown in Fig. 7 held in place by cap screws 151 and 152. The knurled knob 153, projecting at the left-hand face of the said mechanism, is employed to rotate a cam 154 which may be turned to bear against the lowermost tip 155 of the bell crank 112. By turning the knurled knob 153, as viewed in Fig. 5, the cam 154 moves the bell crank in a counter-clockwise direction and thus releases the grip across the blocks 107—108. In this respect the cam 154 operates like the power driven cam 117 but is distinguished therefrom in that it may be operated manually to release the grip on the stock and thus facilitate the insertion of the wire at the start of a coil.

To lubricate the wire stock as it is fed into the grip dies a lubricant reservoir 212 is mounted on the top edge of the plate 61 and is connected by lubricant passageways 213 and 214 with the bore 77a in the die breast.

Preferably the nail machine is provided with straightening rolls indicated in their entirety as at 156. The straightening rolls employed here are of the conventional type and are staggered as shown in Fig. 4a so that the wire stock 102 is straightened as it is pulled through the four staggered rolls. The two rolls at the right-hand side, namely, rolls 157 and 158, are pivotally mounted on a slide 159. The slide is moved transversely of the straightening frame by means of a pin 160 which in turn is moved transversely by a cam lever 161 disposed at the right-hand side of the straightening assembly. When the lever 161 is raised to a horizontal position the low point of the cam surfaces 161a permit the slide 159 to move transversely away from the stock 102 which facilitates the starting of the wire from a new coil. To further assist the starting of a new strand of wire holding rolls 162 and 163 may be employed. The roll 162 is eccentrically mounted as at 164 on the handle shaft 165 so that by turning the handle 165 the roll 162 is moved toward or away from the stock.

Due to the fact that nails may be made on the machine of my invention at a very high rate, namely, a rate such that the nails do not fall by gravity after being cut in time to avoid the header slide at the next advance stroke, it is desirable to provide a means to forcibly eject the cut nails from the path of the header slide. Such ejection insures that the cut nails will be out of the way of the header slide immediately following the cutting operation. To effect this desirable result I provide the apparatus shown best in Figs. 16 and 17 wherein a lever 166 is pivoted on the bed frame as at 167 and carries a roller 168 bearing against a cam 169 carried by the crankshaft. The upper end of the lever 166 is pivotally connected as at 170 to a longitudinally disposed rod 171 which passes through an apertured bracket 172 carried by the bed frame cap 20. A collar 173 is fixed to the rod and a spring 174 is arranged between the collar and the bracket 172 so as to urge the lever 166 in a counter clockwise direction and cause the roller 168 to bear against the cam 169.

An arm 175 is pivoted to the forward end of the rod 171 and the lower end of arm 175 is fixed to the right-hand end of a transversely extending shaft 176. The other end of the shaft 176 is disposed above the header slide and has fixed thereto a pair of longitudinally disposed flat arms 177 which support at their outer ends a vertically disposed tube 178. The support for the tube 178 includes a block 300 which is pivoted as at 301 to the outer ends of the flat arms 177. A shoulder 302 is fixed to the tube 178 and the tube 178 is urged downwardly into the pivoted block 300 by the spring 181 which is wound about a stub shaft 303 carried by block 304 secured as at 305 to the transverse bracket which supports shaft 176. Since the axis of the stub shaft 303 is spaced vertically above the shaft 176 and is slightly forward of the shaft 176, the spring 181 in effect completes a parallel linkage arrangement guiding the plunger and tube assembly 179—178. Since the tube 178 is urged downwardly by the spring 181 and the plunger within the tube is urged downwardly by the coil spring 180 within the tube the nail ejector is adapted to eject nails of various sizes and hardness which offer varying resistance to ejection. Upon oscillation of the lever 166 by the crankshaft cam 169 the tube 178 is raised and lowered with respect to the horizontal path of the header slide. As shown in Fig. 16, the cam 169 raises the tube 178 out of the path of the header slide punch 17a during the heading operation. Within the tube 178 is mounted a nail engaging plunger 179 which is mounted therein for limited reciprocating movement with respect to the tube. The member 179 is urged in a downward direction by a coil spring 180 within the tube. When the header slide is retracted and the stock advances into cutting position, such as illustrated in Fig. 10, the spring 174 causes the arms 177 and the tube 178 carried thereby to lower the plunger 179 into engagement with the uncut nail. In this last-named position the spring mounting of the plunger 179 is such as to cause energy to be stored in said spring 180 with the result that the plunger 179 is urging the nail downwardly before the nail has been cut. The result of this arrangement is that as soon as the nail is severed by the knives 65 the nail is forcibly projected downwardly by the plunger 179 somewhat in the fashion of an arrow being shot from a bow. The cam and lever arrangement is such that the plunger 179 is withdrawn as soon as the nail is ejected from the path of the header slide and the header slide may advance to head the next nail.

To insure that metal chips, whiskers and scale resulting from the nail making operation will be confined with respect to the bearings and other close fitting parts of the machine I have provided means to enclose and shroud those areas of the machine where such particles are produced. Referring particularly to Figs. 14 and 15, a fixed shroud member 182 extends transversely of the machine enclosing the bearing cap member 20. A sectional shroud 183 is hinged as at 184 to the left-hand side of the machine adjacent the die breast. The section 185 is bent at right angles to the main section 183 and the top section 186 is hinged to the upper edge of 183 so that this sectional shroud may be swung to the closed position as shown in Fig. 1. When closed the vertical edge of the section 183 abuts the depending flange 182a on the fixed shroud 182. The horizontal edge of the top 186 fits along the vertical side of the die breast plate 60 and the lower edge of the section 183 snugly fits the bed frame so as to prevent metal chips and whiskers from coming out of the machine through this area. As shown in Figs. 13 and 14, a hinged shroud section 187 is mounted to enclose the nail ejector mechanism and thus prevent metal chips from escaping into this area of the machine.

At the right-hand side of the die breast a hinged shroud 188 is mounted and includes a hinged cover portion 189 and integrally formed side portion 190. The shroud 188 is pivoted as at 191 to the bed frame and may be swung to closed position so as to prevent the escape of metal chips and the like at this side of the machine. Each cutter bar is provided with a resilient shroud plate extending vertically along the face of the cutter bar adjacent the die breast. Cutter bar 27 has mounted in a vertically extending groove a plate 192 which bears at its free edge against the sloping vertical face 193 on the plate 60. A similar plate 194 is carried on the cutter bar 28 and bears against the face 195 on plate 61. The resilient plates 192 and 194 follow the surface of the faces 193 and 195 during the swinging of the cutter bars and prevent the escape of metal chips around the cutter bars during the machine operation. Those skilled in the art will recognize the advantages resulting from confinement of the chips and whiskers of metal which otherwise destroy bearings and wedge in moving parts of the machine.

From the foregoing description of the sheet metal shrouding it will be understood that when the hinged shrouds 187—188 are closed that the cutting and heading operations will be enclosed on all sides except the bottom area which forms the exit chute for the nails and that the confined chips and whiskers are thus guided down into the chute and are discharged from the machine beneath the line of the header slide reciprocation. A screen or the like may be placed in bottom of the discharge chute so that the fine chips and whiskers will drop into a drawer in the machine such as 5a, shown in Fig. 1, and that the nails will be discharged above the screen into chute 7.

From the foregoing detailed description of the structure of my nail making machine, it will be observed that one-half of the cycle or 180° of crankshaft rotation occurs between the forming of the head of the nail and the cutoff of the finished nail. This construction provides for the shortest possible heading slide movement for any given maximum length of nail because the hammer which forms the head is at back dead center position and provides the maximum clearance between the die breast and the hammer when the nail is cut off and ejected.

The toggle and pin connection arrangement for actuating the cutoff mechanism eliminates the use of cams and springs which would adversely limit the over-all operating speed of the machine. The arrangement disclosed here also permits the use of more efficient ejection mechanism for the nail and permits the use of one driven by a rotary cam at a time in the machine cycle when the header slide is at back dead center position and maximum clearance is provided between the grip dies and the header slide hammer. A further advantage of the drive for the cutter bar mechanism I have provided is the reduction in travel of the cutter knives wherein the cutter levers are at their maximum opening at that time in the machine cycle when the header slide is at the front dead center. The toggle design is such that the knives are moving relatively slow with respect to the over-all movement of the cutter bar when the knives engage the stock which minimizes cutter impact on the stock and thus increases the life of the cutter knives. The toggle drive for the cutters permits the use of the abutments which prevent over travel of the cutters and prevents impact of one knife upon the other after the nail is cut. I have found that by thus actuating the cutters and preventing impact both with respect to the wire and with respect to the knives that a tungsten carbide cutter may be used in a high speed nail machine.

The particular header slide and cutter operating mechanism imposes certain timing and operating limitations upon the grip die mechanism. The grip dies, of course, must be opened sufficiently wide so as to clear barbs on the under side of the head of the nail before the feed stroke is started. Such grip operating cam requires about 20% of one revolution of the main crank and if quicker die opening is attempted a heavier spring load is required to hold the roller on the grip cam which adversely affects the life of the roller and its bearing. In closing the grip dies the wire stock must be gripped before the cutters touch the wire so that the nail point which is cut will not be off-center. In the construction here disclosed the grip lever 84 is compressing the spring 86 and gripping pressure is being applied to the wire so that there is no severe impact on the roller 87 and the cam, with the result that about 10% of the revolution of the cam is sufficient for closing the dies after the feed stops and the cutoff starts.

Since only half of the cycle of the machine occurs between the upsetting of the nail head and the cutoff, it is necessary in a half revolution to open the grip dies, feed in wire to the proper length, and close the grip dies and cut off the nail. During this half revolution of the main crankshaft a severe limitation is imposed on the feeding mechanism because of the speed at which it must operate. This feed time occurs during that period after the dies are opened sufficiently wide to clear the barbs on the under side of the head of the nail and the time when the grip dies grip the wire prior to the start of the cutoff. The end of the feed for each length of nail should always come at the same point in the time cycle of the machine since a premature completion of the feed stroke in relation to the gripper die closing would allow the wire stock to return with the feed carraige. If the end of the feed is delayed with respect to the closing of the grip dies a buckling of the wire stock between the feed carriage and the gripper dies will result. In the feed mechanism which I have here provided, the wire stock is advanced to the proper length and is so designed with respect to the grip dies, the header slide and the cutoff mechanism, that high speed over-all operation, such as for instance, more than 1000 nails per minute is accomplished. The forward feed of the stock during about 100° of crank rotation makes it possible to open the grip dies after heading, feed the wire to its proper length, close the grip dies and cut off the nail, all within one-half of one revolution of the main crankshaft.

Although I have described one form of my invention in considerable detail, it will be appreciated by those skilled in the art that numerous modifications may be made therein without departing from the scope of the invention as defined in the following claims.

What is claimed is:

1. A nail making machine having a frame and a crank shaft for reciprocating a header slide, the combination comprising a pivot pin carried by the frame above said header slide, a second pin in vertical alignment with said first named pivot pin carried by the frame below said header slide, a pair of cooperating cutters disposed longitudinally alongside of said header slide, each cutter including a pivot ear portion above the header slide and an ear portion below the header slide, said ears mounted on said pivot pins, means to actuate said cutters comprising three links each having one end thereof pivotally connected to a common pivot pin, the other end of a first link being pivotally connected to the cutter near the free end thereof, the other end of a second link being pivotally connected to the header slide and the other end of a third link pivotally connected to the frame, said first and second links being in longitudinal alignment with each other in cutting position of said cutters and forming an obtue angle with each other in distended position of said cutters in response to reciprocation of said header slide.

2. In a nail making machine having a bed frame, a die breast at one end of said frame, a reciprocating header slide actuated by a crank shaft movable toward and away from said die breast in response to crank shaft rotation, the combination comprising a pair of cooperating cutters pivotally mounted on the frame on a common vertical axis transverse to the reciprocation of the header slide, a toggle link pivoted to each cutter bar adjacent its free end, a toggle link pivoted on the frame at one end thereof and to the first named toggle link at the other end thereof, and an actuating link having one end thereof pivoted to the header slide and the other end thereof to a common pivot of the two said toggle links whereby the free ends of the cutters are moved toward and away from each other in response to header slide reciprocation, and adjustable bumper pads carried on said cutters away from the pivoted ends arranged to engage the sides of said die breasts to limit the movement of said cutters toward each other.

3. In a nail making machine having a bed frame, a die breast at one end of said frame, a reciprocating header slide actuated by a crank shaft movable toward and away from said die breast in response to crank shaft rotation, the combination comprising a pair of cooperating cutters pivotally mounted on the frame on a common vertical axis transverse to the reciprocation of the header slide, a toggle link pivoted to each cutter bar adjacent its free end, a toggle link pivoted on the frame at one end thereof and to the first named toggle link at the other end thereof, and an actuating link having one end thereof pivoted to the header slide and the other end thereof to a common pivot of the two said toggle links whereby the free ends of the cutters are moved toward and away from each other in response to header slide reciprocation, and resilient chip guards mounted on said cutters to operatively engage plate means integral with said die breast thereby preventing escape of metal chips past the cutter bars during operation.

References Cited in the file of this patent

UNITED STATES PATENTS

| | | |
|---|---|---|
| 467,362 | Blackburn | Jan. 19, 1892 |
| 540,903 | Dailey | June 11, 1895 |
| 979,457 | Francis | Dec. 27, 1910 |
| 999,052 | McIlvried | July 25, 1911 |
| 1,382,625 | Clouse | June 28, 1921 |
| 1,427,845 | Priesthoff | Sept. 5, 1922 |
| 1,542,341 | Deckert | June 16, 1925 |
| 1,682,373 | Davis | Aug. 28, 1928 |
| 1,685,439 | Strout | Sept. 25, 1928 |
| 1,686,392 | Noll | Oct. 2, 1928 |
| 1,775,791 | Ungar | Sept. 16, 1930 |
| 2,214,362 | Cochenour | Sept. 10, 1940 |
| 2,359,815 | Wilcox | Oct. 10, 1944 |
| 2,580,055 | Weber | Dec. 25, 1951 |

FOREIGN PATENTS

| | | |
|---|---|---|
| 2,561 | Great Britain | July 17, 1875 |
| 565,651 | France | Feb. 2, 1924 |

OTHER REFERENCES

Product Engineering-Annual Handbook of Product-Design of 1953; pub. date November 1952.